Aug. 5, 1952  L. R. YOUNG, JR., ET AL  2,605,576
FISHING LINE SINKER
Filed April 25, 1950
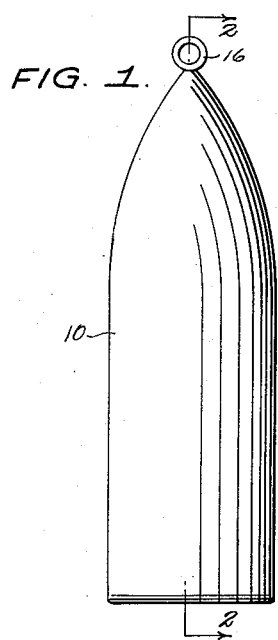
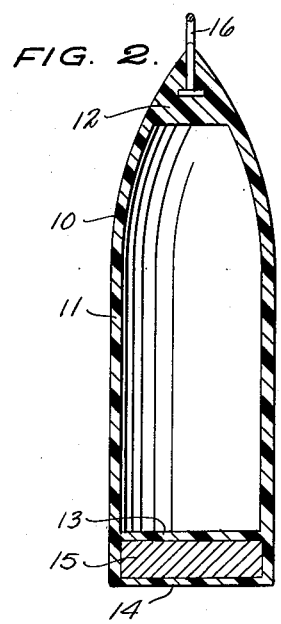
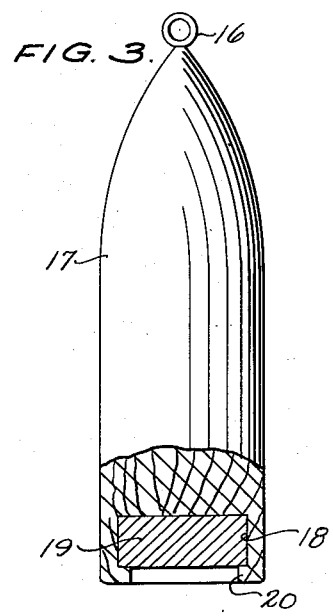
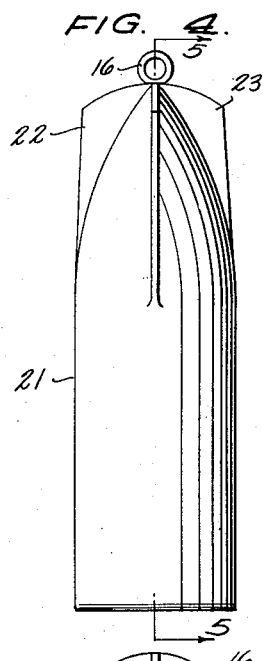
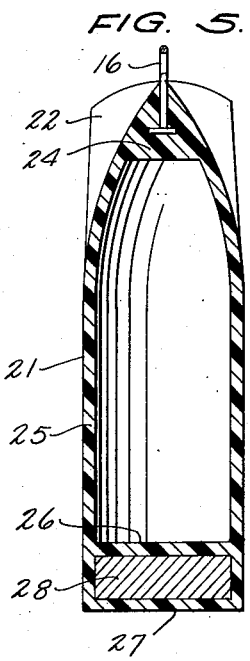
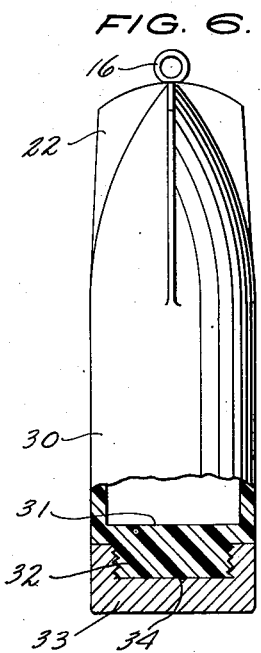
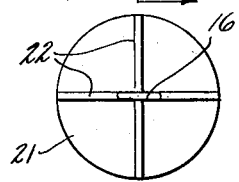
INVENTORS
LLOYD R. YOUNG, JR.
JOHN W. LASTER,
BY
McMorrow, Berman & Davidson
ATTORNEYS.

Patented Aug. 5, 1952

2,605,576

UNITED STATES PATENT OFFICE 2,605,576

FISHING LINE SINKER

Lloyd R. Young, Jr., and John W. Laster, Los Angeles, Calif.

Application April 25, 1950, Serial No. 157,976

1 Claim. (Cl. 43—43.1)

This invention relates to fishing line sinkers and more particularly to a sinker especially designed to rise rapidly to the surface of the water when the fishing line to which it is attached is reeled in.

It is among the objects of the invention to provide an improved sinker having a buoyant portion and a sinkable or nonbuoyant portion with the two portions so related that the sinker will occupy a predetermined position in the water and so balanced that the sinker will sink to any desired depth in the water and will rise rapidly to the surface of the water without dragging along the bottom when the line is reeled in and will hence, avoid fouling itself or the line on stones, weeds or other obstructions at the bottom of the water, which may be provided with interchangeable weights to vary the proportion between the buoyant and nonbuoyant portions thereof and may be provided with guide fins to facilitate its rise to the surface of the water when the line to which it is attached is reeled in, and which is durable in construction, economical to manufacture, and neat and attractive in appearance.

Other objects and advantages will become apparent from a consideration of the following description and the appended claim in conjunction with the accompanying drawing wherein:

Figure 1 is an elevational view of a fishing line sinker illustrative of the invention;

Figure 2 is a longitudinal cross sectional view on the line 2—2 of Figure 1;

Figure 3 is a longitudinal elevational view of a somewhat modified form of fishing line sinker constructed according to the invention, a portion being broken away and shown in cross section to better illustrate the construction thereof;

Figure 4 is a longitudinal elevational view of a still further modified form of fishing line sinker;

Figure 5 is a longitudinal cross sectional view on the line 5—5 of Figure 4;

Figure 6 is a longitudinal elevational view of a still further modified form of fishing line sinker, a portion being broken away and shown in cross section to better illustrate the construction thereof; and Figure 7 is a top plan view of the sinker illustrated in Figure 4 or of the sinker illustrated in Figure 6.

With continued reference to the drawing, the fishing line sinker illustrated in Figure 1 comprises an elongated buoyant body 10 of cylindrical shape and having one end pointed and the portion thereof adjacent such pointed end convexly tapered to the pointed end. This body is made hollow and has a cylindrical side wall 11 which is thin in proportion to the diameter of the body and has a solid portion 12 at its pointed end. Adjacent its end remote from its pointed end the body is provided with a thin walled transverse partition 13 and is provided at its end remote from the pointed end with an end wall 14 substantially in a plane perpendicular to the longitudinal center line of the body and spaced from and substantially parallel to the partition 13 to provide a space between the partition and the end wall. A body 15 of nonbuoyant material, such as lead, is disposed in the space between the partition 13 and the end wall 14 and is of sufficient weight to cause the entire sinker to sink to the bottom of a body of water.

A line attaching eye 16 is secured in the thickened portion 12 at the pointed end of the body 10 and projects from the pointed end of the body to receive one end of a fishing line to attach the line to the sinker. The eye 16 is preferably swivelly mounted in the thickened end portion 12 of the body 10 so that the sinker may rotate in the water without twisting the line.

The hollow body 10 may be formed of any suitable material, a moldable material of high structural strength, such as synthetic resin plastic or hard rubber, having been found entirely satisfactory in use, and this body may be externally colored or coated or decorated as may be desired.

With the weight 15 disposed entirely at one end of the body 10, when the sinker settles in the water it will remain in an upright position with the line attaching eye 16 at the top.

With the sinker in this upright position at the bottom of a body of water, if the line to which the sinker is attached is reeled in the sinker will be caused to lean in the direction of the line pull, but will remain in an upwardly inclined position and will immediately start to rise under the pull of the line and will move continuously upward as the line is reeled in until the sinker reaches the surface of the water. This prevents the sinker and the line from becoming fouled on obstructions, such as stones, logs and weeds, on the bottom of the body of water.

The modified form of sinker illustrated in Figure 3 is substantially the same as that illustrated in Figures 1 and 2 except that the body 17, corresponding to the body 10, is made solid and is formed of a buoyant material, such as wood. This body 17 has a pointed end from which the line attaching eye 16 projects and a portion which convexly tapers to this pointed end. The remainder of the body is preferably of cylindrical shape and the body is provided in its end remote from the pointed end with a cylindrical recess 18 in which a weight 19 of disc or cylindrical shape is mounted. An inwardly projecting flange structure 20 is provided at the open end of the recess 18 and the material of the weight 19 may be poured into the recess in a molten or plastic condition and will be retained in the recess by the inwardly projecting annular flange 20.

The modified form of the invention shown in Figures 4 and 5 is the same as that illustrated in Figures 1 and 2 except that the body 21 of this further modified form of the invention is provided with outwardly projecting fins 22 which extend longitudinally along the tapered portion of the body to the pointed end thereof. These fins are thin walled, plate-like formations and are spaced apart at angular intervals of substantially ninety degrees around the tapered portion of the body and have their outer longitudinal edges substantially in alignment with the cylindrical surface of the cylindrical portion of the body. The ends of the fins at the pointed end of the body are arcuately curved, as indicated at 23, in a direction away from the eye 16 so that the fins will not interfere with a line attached to the sinker by the eye 16. In this modified form of the invention a solid portion 24 is provided at the pointed end of the body corresponding to the solid portion 12 of the form illustrated in Figures 1 and 2, the body is hollow and has a thin side wall 25 and is also provided near its end opposite the pointed end with a transversely extending partition wall 26 and at its end opposite the pointed end with an end wall 27. The partition wall 26 and end wall 27 are substantially parallel to each other and spaced apart to provide therebetween a space receiving a cylindrical or disc shaped weight 28 corresponding to the weight 15 of the form of the invention shown in Figures 1 and 2.

The operation of the form of the invention shown in Figures 4 and 5 is the same as the operation of the forms shown in Figures 1, 2 and 3 and described above, except that the fins 22 serve to guide the end of the sinker to which the line is attached and facilitate the rapid rise of the sinker from the bottom to the surface of a body of water as the line is reeled in.

In the form of the invention illustrated in Figure 6 the body of the sinker is the same as that illustrated in Figures 4 and 5 and discussed above, except that instead of having the partition wall 26 and the end wall 27 spaced from the partition wall the body 30 of the sinker illustrated in Figure 6 has opposite its pointed end an end wall 31 provided on its outer surface with an externally screw threaded cylindrical boss 32 which is substantially coaxial with the longitudinal axis of the body 30. A weight 33 in the form of a cylindrical disc is provided in one side with a cylindrical recess 34 dimensioned to receive the boss 32 and provided with internal screw threads engageable with the external threads on the boss. The weight 33 is threadable onto and off of the boss 32 and may be interchanged when desired so that nonbuoyant bodies of different weights may be attached to the body 30 to accommodate the sinker to different operating conditions.

The operation of the form of sinker illustrated in Figure 6 is the same as the operation of the form illustrated in Figures 4 and 5 and described above.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A fishing line sinker comprising a hollow buoyant body of elongated cylindrical shape having at one end a tapered portion terminating in a pointed end and having at its other end an end wall substantially in a plane perpendicular to the longitudinal center line of said body, a line attaching eye secured to said body at the pointed end thereof, a partition wall within said hollow body spaced inwardly of the latter from said end wall a distance materially less than the length of said hollow body and disposed substantially parallel to said end wall, and a non-buoyant body in said buoyant body between said end wall and said partition wall.

LLOYD R. YOUNG, JR.
JOHN W. LASTER.

REFERENCES CITED

The following references are of record in the file of this patent:

UNITED STATES PATENTS

| Number | Name | Date |
| --- | --- | --- |
| 240,611 | Redfield | Apr. 26, 1881 |
| 725,428 | Evans | Apr. 14, 1903 |
| 903,333 | Slocum et al. | Nov. 10, 1908 |
| 1,239,956 | Phinney | Sept. 11, 1917 |
| 2,070,514 | Marlow | Feb. 9, 1937 |
| 2,083,630 | Angelica | June 15, 1937 |
| 2,173,540 | Rayburn | Sept. 19, 1939 |
| 2,239,934 | Ruiz | Apr. 29, 1941 |
| 2,242,965 | Adams | May 20, 1941 |
| 2,399,371 | Mendelson | Apr. 30, 1946 |